United States Patent
Tobin et al.

(10) Patent No.: US 7,380,494 B2
(45) Date of Patent: *Jun. 3, 2008

(54) DISPENSING MACHINE

(75) Inventors: John William Tobin, Hillsdale, NJ (US); Mauro Dominick Mordini, Hopatcong, NJ (US)

(73) Assignee: Unilever Bestfoods North America, division of Conopco, Inc., Englewood Cliffs, NJ (US)

( * ) Notice: Subject to any disclaimer, the term of this patent is extended or adjusted under 35 U.S.C. 154(b) by 427 days.

This patent is subject to a terminal disclaimer.

(21) Appl. No.: 10/897,747

(22) Filed: Jul. 23, 2004

(65) Prior Publication Data

US 2006/0016343 A1    Jan. 26, 2006

(51) Int. Cl.
*A47J 31/00* (2006.01)
*B67D 5/08* (2006.01)

(52) U.S. Cl. .................. 99/275; 99/323.3; 99/290; 222/129.1; 222/145.5

(58) Field of Classification Search .................. 99/275, 99/323.3, 290, 279; 222/129.3, 129.1, 146.1, 222/146.2, 129.2, 145.1, 145.5, 145.6, 146.5, 222/146.6; 137/109, 111, 893
See application file for complete search history.

(56) References Cited

U.S. PATENT DOCUMENTS

| | | | | |
|---|---|---|---|---|
| 3,656,518 A | * | 4/1972 | Aronson | 141/1 |
| 3,750,908 A | * | 8/1973 | Bauerlein et al. | 222/80 |
| 4,493,249 A | * | 1/1985 | Stover | 99/275 |
| 5,579,678 A | * | 12/1996 | Goerndt | 99/280 |
| 6,135,009 A | | 10/2000 | Lassota | |
| 6,240,829 B1 | * | 6/2001 | McGarrah | 99/275 |
| 6,413,570 B1 | | 7/2002 | Lehmberg et al. | |
| 6,669,053 B1 | * | 12/2003 | Garson et al. | 222/61 |
| 6,712,242 B2 | * | 3/2004 | Friedman | 222/129.2 |
| 6,792,847 B2 | * | 9/2004 | Tobin et al. | 99/275 |
| 2002/0170925 A1 | * | 11/2002 | Friedman | 222/129.1 |

FOREIGN PATENT DOCUMENTS

WO    01/65985    9/2001

* cited by examiner

*Primary Examiner*—Reginald L Alexander
(74) *Attorney, Agent, or Firm*—Edward A. Squillante, Jr.

(57) ABSTRACT

The present invention is directed to a dispensing machine and method for making a beverage. The dispensing machine of this invention has a delivery means which can deliver beverage precursor and beverage enhancing component with a single pump. The method results in a beverage, such as a tea-based beverage, that has superior quality, and the dispensing machine is quieter and more energy efficient than standard beverage dispensing machines.

9 Claims, 2 Drawing Sheets

DISPENSING MACHINE

FIELD OF THE INVENTION

The present invention is directed to a beverage dispensing or brewing machine. More particularly, the present invention is directed to a beverage dispensing or brewing machine comprising a delivery means suitable to deliver a beverage enhancing component and a beverage precursor with a single pump. The delivery means is suitable to deliver beverage enhancing component to the beverage precursor directly, whereby the beverage enhancing component and the beverage precursor are drawn together from negative pressure created by a single pump that pumps the beverage precursor in the beverage dispensing machine. The beverage dispensed from the beverage dispensing machine of the present invention, has superior flavor and aroma characteristics, and such a beverage is unexpectedly made with a beverage dispensing machine that is lighter, easier to refill, quieter and more energy efficient.

BACKGROUND OF THE INVENTION

Methods for preparing ready-to-dispense beverages, like tea beverages, are known. For example, many food establishments have brewing systems that dispense tea-based beverages ready for consumption. Typically, such systems operate by mixing an instant tea or a brewed tea concentrate with hot water to produce a hot water composition that is combined with cold water to thereby produce a tea beverage that is ready to drink.

Unfortunately, however, when preparing beverages, like tea beverages, from a beverage precursor in the manner described above, the beverages often have, for example, flavor and aroma characteristics that do not meet desired consumer expectations, especially when the beverage precursor employed has aged. This is true because beverage enhancing components, like flavor- and aroma-generating compounds found in beverage precursors, typically degrade within the beverage precursor, a direct result of their unstable nature in the presence of conventional beverage precursor components.

In view of the above, ready-to-drink tea dispensing machines, for example, have been modified to post dose flavor and aroma compounds. Such tea dispensing machines are energy inefficient, difficult to refill and often noisy since they require a first pump to pump beverage precursor and a second pump to pump the flavor and aroma compounds.

It is of increasing interest to develop a beverage dispensing machine that comprises a delivery means for efficiently delivering a beverage enhancing component (not formulated within a beverage precursor) to a beverage precursor. This invention, therefore, is directed to a beverage dispensing machine comprising a delivery means suitable to deliver a beverage enhancing component to a beverage precursor, whereby the beverage enhancing component is drawn into the beverage precursor from negative pressure created by the beverage precursor pump of the beverage dispensing machine. Such an apparatus unexpectedly produces a beverage of superior flavor and aroma while at the same time being lighter, easier to refill, quieter and more energy efficient than conventional machines. The beverage dispensing machine of this invention pumps beverage precursor and beverage enhancing component with a single pump.

ADDITIONAL INFORMATION

Efforts have been disclosed for making beverages. In U.S. Pat. No. 6,413,570, a brewed tea concentrate suitable for making a tea beverage is described.

Still other efforts have been disclosed for dispensing beverages. In U.S. Pat. No. 6,135,009, a beverage brewing system on a serving cart assembly is described.

Even other efforts have been disclosed for dispensing beverages. In World Application WO 01/65985, a brewing device having automatic and semi-automatic brewing modes is described.

None of the additional information above describes a beverage dispensing machine comprising a delivery means suitable to deliver (through negative pressure) a beverage enhancing component to a beverage precursor within the beverage dispensing machine whereby the same has a single pump for pumping beverage precursor and beverage enhancing component.

SUMMARY OF THE INVENTION

In a first aspect, the present invention is directed to dispensing machine comprising a means for delivering beverage precursor and beverage enhancing component with a single pump.

In a second aspect, the present invention is directed to a method for making a beverage with the dispensing machine of the first aspect of the invention.

In a third aspect, the present invention is directed to a beverage made with the dispensing machine of the first aspect of this invention.

Beverage precursor, as defined herein, is meant to mean a material that can be contacted with a diluent, like water, to produce a beverage, including a liquid extract or concentrate, powder, such as those used to make tea or ground bean, such as ground coffee bean.

Delivery means is defined as a means for delivering a beverage enhancing component and beverage precursor with a single pump.

Brewing system means a system comprising the delivery means of the present invention and conduit, pumps and diluent feed lines (e.g., water feed lines) leading to the exit pore of the beverage dispensing machine.

Beverage enhancing component is defined to mean a component that is naturally found in beverage precursor. Such a beverage enhancing component may be isolated from beverage precursor and is preferably a liquid at ambient temperature. Illustrative beverage enhancing components include, without limitation, flavor-generating compounds, aroma-generating compounds, color-generating compounds and the like. Moreover, typical beverage additives like milk and table sugar for coffee and tea, are not beverage enhancing components as defined herein.

Beverage means a liquid composition that a consumer may drink, either hot or cold. Beverage, therefore, includes soups meant for drinking, fruit-based beverages, coffee and tea-based beverages and milk-based beverages, whereby coffee beverages are typically derived from a coffee bean and include ground coffee, and tea-based beverages are derived from *Camillia sinensis* and also include herbal teas. The fruit-based beverage is preferably, lemonade.

Viscosity is the flow resistance taken with a Brookfield Programmable, DV-II Viscometer at ambient temperature with Spindle No. LV2 at 30 rpm.

BRIEF DESCRIPTION OF THE FIGURES

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

There is no limitation with respect to the type of beverage dispensing or brewing machine that may be used with the delivery means of this invention, as long as the machine has the capacity to deliver a beverage precursor and dispense a beverage suitable for human consumption. Illustrative examples of the types of beverage dispensing machines that may be fitted or modified to comprise the delivery means of this invention include those offered from suppliers like Bunn-O-Matic, IMI Cornelius, Inc., Curtis, Black and Decker, and Cecilware. The most preferred beverage dispensing machines that may be used with the delivery means of the present invention are made available by Unilever Bestfoods and sold under the Lipton Tea Brand.

As to the pumps used with the delivery means of this invention, such pumps are limited to those that are employable to deliver beverage precursors for beverages that are consumable by humans (i.e., food grade pumps). The pumps suitable for use in this invention are made commercially available from suppliers like Cole-Palmer (e.g., Master Flex Peristaltic Pump); Seitz, Inc. (e.g., gear comprising pumps); Watson-Marlow Bredel; and Barnant Company.

The conduit (e.g., lines, peristalic tubing) used in this invention is limited only to the extent that it may be used to deliver beverages suitable for consumption by humans. Such conduit may be made of materials comprising copper, galvanized metal, stainless steel, polycarbonate, polyamide, polyester, polyolefin, or the like. In a most preferred embodiment, the conduit used in the present invention is made of Norprene®.

The beverage precursor suitable for use in this invention is often a powder or concentrate used to make soup, coffee, tea, milk-based or a fruit flavored beverage. In a preferred embodiment, however, the beverage precursor is a concentrate or extract used to make tea-based beverages whereby the concentrate is preferably at least about 45.0% by weight total solids and made available from suppliers like Unilever Bestfoods, under the general category of Lipton Tea Concentrates or Extracts. Such a beverage precursor typically has a viscosity from about 1.0 to about 2,000 cps, and preferably, from about 25.0 to about 500.0 cps, and most preferably, from about 50.0 to about 150.0 cps, including all ranges subsumed therein. A more detailed description of the preferred concentrates that may be used in this invention is set forth in U.S. Pat. No. 6,274,187, the disclosure of which is incorporated herein by reference.

Figure 1:
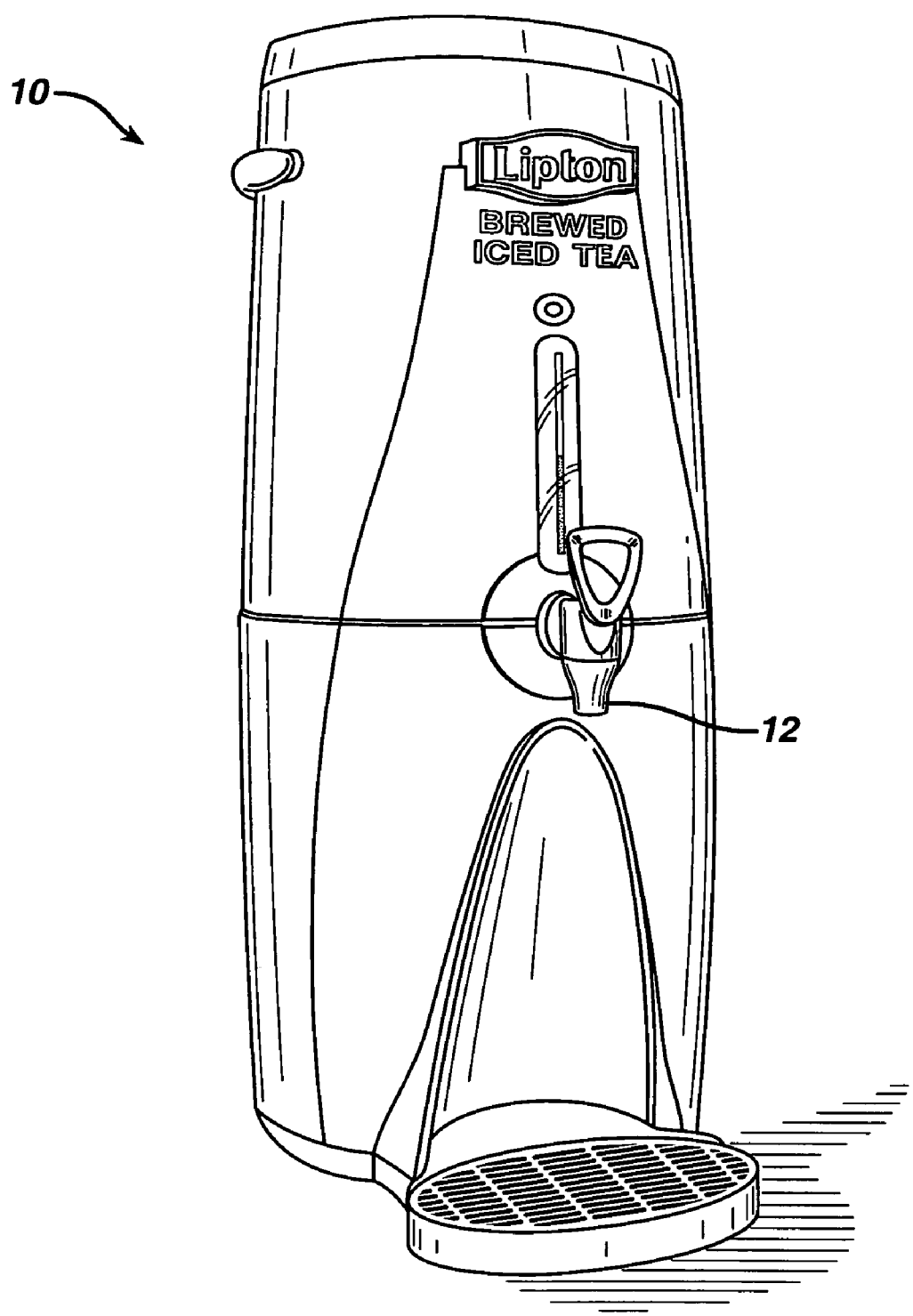
FIG. 1 is a drawing of an illustrative dispensing machine that can comprise the delivery means of the present invention.

Turning to the figures, FIG. 1 shows a beverage dispensing machine 10 comprising the delivery means of the present invention (not shown). The beverage dispensing machine 10 may be used, for example, to dispense a tea-based beverage on demand (not shown) from exit pore 12.

Figure 2:
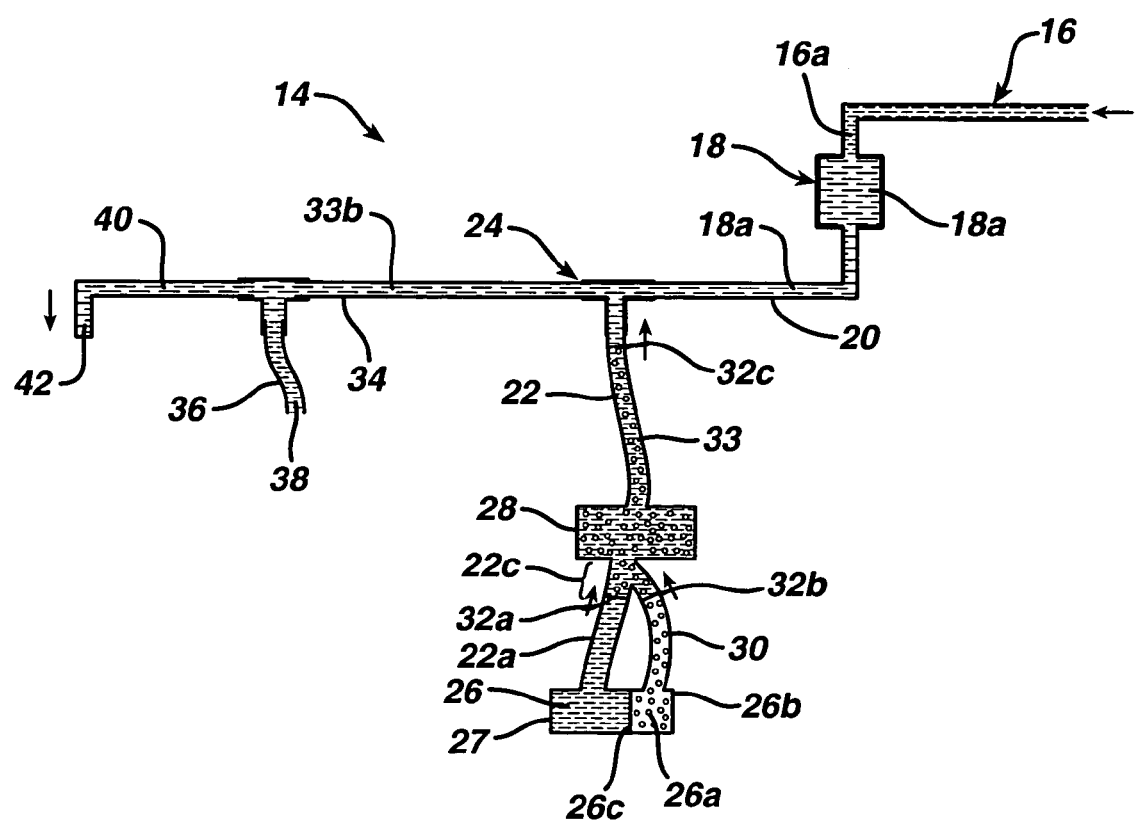
FIG. 2 is an illustrative schematic diagram of the delivery means of this invention.

FIG. 2 depicts an illustrative schematic diagram of a brewing system 14 which is preferably within beverage dispensing machine 10 and equipped with an illustrative version of the delivery means of the present invention such that flavor enhancing component is directly delivered to the beverage precursor. Diluent feed conduit 16 supplies diluent (e.g., water, juice, milk or the like) 16a to diluent heater tank 18 to produce heated diluent 18a. Conduit for supplying heated diluent 20 joins, for example, post-pump conduit 22 at mixing conduit 24. Beverage precursor 26, in storage compartment 27, is pumped, via food grade pump 28, to post-pump conduit 22 which stores or holds and supplies a mixture of beverage precursor 26 and beverage enhancing component 26a to conduit for supplying heated diluent 20.

Beverage enhancing component 26a in storage device 26b (e.g., bottle or polymeric sachet) may be a separate and distinct device (not shown), or preferably, attached to (or operatively associated with) storage compartment 27 wherein separation barrier 26c prevents beverage precursor 26 from mixing with beverage enhancing component 26a during storage. Beverage enhancing component 26a is transported (i.e., fed or drawn) to beverage precursor 26 via conduit for transporting beverage enhancing component 30 (connected to or operatively associated with pre-pump conduit 22a) wherein the same is delivered to beverage precursor 26 at pre-pump conduit 22a, and preferably, at a region 22c of pre-pump conduit 22a closest to food grade pump 28. The beverage enhancing component 26a usually has a viscosity from about 0.5 to about 10.0, and preferably, from about 0.8 to about 1.2, including all ranges subsumed therein.

Negative pressure created by food grade pump 28 and within conduit for transporting beverage enhancing component 30 draws beverage enhancing component 26a out of storage device 26b and to beverage precursor 26. Such an arrangement allows for the transport of beverage precursor 26 and beverage enhancing component 26a with a single food grade pump 28.

Optionally, and to prevent backflow, reverse flow prevention valves (like check valves) 32a, 32b and 32c may be positioned in pre-pump conduit 22a, conduit for transporting beverage enhancing component 30 and post-pump conduit 22, respectively.

Subsequent to entering post-pump conduit 22, beverage precursor 26 and beverage enhancing component 26a form a pre-beverage mixture 33 that is pumped into the flow of heated diluent 18a within conduit for carrying heated diluent 20 and when a beverage is desired. The resulting heated mixture 33b is transported via heated mixture conduit 34 (the anterior portion of conduit for carrying heated diluent 20) where optional conduit for supplying diluent that has not been heated 36, optionally, supplies non-heated diluent 38 (supplied from a storage container, tap or both and not shown) into heated mixture 33b. Produced is a superior beverage 40, having, for example, excellent flavor, color and aroma characteristics whereby beverage 40 is ready to be discharged at opening 42 by way of exit pore 12.

It is within the scope of this invention for the conduit for transporting beverage enhancing component 30 to be directly connected to food grade pump 28 and for beverage precursor 26 to be fed or drawn into conduit for transporting beverage enhancing component 30. This may be achieved by connecting pre-pump conduit 22a to conduit for transporting beverage enhancing component 30, and again, by connecting conduit for transporting beverage enhancing component 30 to food pump grade 28. The brewing system depicted in FIG. 2, however, is especially preferred.

Regarding the delivery means of this invention, it is often desired for the inside diameter of the pre-pump conduit 22a to be less than about 1.30 cm, and preferably, from about 0.20 cm to about 1.00 cm, and most preferably, from about 0.25 cm to about 0.35 cm, including all ranges subsumed therein. Also, it is often desired for the inside diameter of the conduit for transporting beverage enhancing component 30 to have an inside diameter of less than about 0.35 cm, and preferably, from about 0.075 cm to about 0.30 cm, and most preferably, from about 0.08 cm to about 0.15 cm, including all ranges subsumed therein.

In an especially preferred embodiment, beverage enhancing component 26a flows into post-pump conduit 22 at a rate from about 10.0 cm/sec to about 20.0 cm/sec, and preferably, at a rate from about 12.5 cm/sec to about 17.5 cm/sec, including all ranges subsumed therein. Beverage precursor 26a, on the otherhand, flows into post-pump conduit 22 at a rate of about 7.5 cm/sec to about 15.0 cm/sec, and preferably, at a rate from about 8.5 cm/sec to about 13.5 cm/sec, including all ranges subsumed herein. In another especially preferred embodiment, the amount of beverage precursor 26 in the beverage produced with the dispensing machine of this invention is from about 2.0 g/l to about 20 g/l, and preferably, from about 10.0 g/l to about 15 g/l wherein the amount of beverage enhancing component 26a in the beverage produced with the dispensing machine of the present invention is from about 0.25 to about 5.0 g/l, and preferably, from about 1.5 g/l to about 2.5 g/l, including all ranges subsumed therein. In still another especially preferred embodiment, the amount of pre-beverage mixture 33 stored within post-pump conduit 22 does not exceed enough by volume to make one-half a liter of ready-to-drink tea (having about 0.3% by weight tea solids).

When making a beverage, like a tea-based beverage, with the dispensing machine 10 of the present invention, the beverage typically comprises at least about 80.0%, and preferably, at least about 85.0%, and most preferably, at least about 90.0% by weight total diluent (i.e., total diluent being the total amount of heated and non-heated diluent), the balance of the total weight of the beverage comprising no less than about 0.1% by weight beverage enhancing component, and preferably, no less than about 1.0% by weight beverage precursor. The total amount of diluent used can comprise 100.0% heated diluent, but preferably comprises less than about 45.0%, and most preferably, less than about 30.0% by weight heated diluent, but at least about 0.2% by weight heated diluent. Moreover, the beverage brewed via the dispensing machine 10 of the present invention typically exits the beverage brewing machine from the exit port at a flow rate from about 1.0 to about 5.0, and preferably, from about 1.5 to about 4.0, and most preferably, from about 2.0 to about 3.0 fluid ounces/second, including all ranges subsumed therein.

It is particularly noted that refilling the dispensing machine 10 with beverage precursor 26 and beverage enhancing component 26a has been made easier since only the pre-pump conduit 22a and conduit for transporting beverage enhancing component 30 need to be connected to storage compartment 27 and storage device 26b, respectively in order for the dispensing machine to operate. Also, since the dispensing machine of this invention does not employ a pump to pump beverage enhancing component and a pump to pump beverage precursor, it is lighter, easier to refill, and quieter.

The following example is provided to facilitate an understanding of the present invention. The example is not intended to limit the scope of the invention as set forth in the claims.

EXAMPLE

A dispensing machine having the capacity to dispense beverage precursor and beverage enhancing component with a single pump (as described in FIG. 2) was made. Peristaltic tubing was used with a tee to connect the conduit for transporting beverage enhancing component to pre-pump conduit carrying beverage precursor (tea concentrate with about 50% tea solids). The conduit for transporting beverage enhancing component was attached to a storage compartment having beverage enhancing component (flavor and aroma compounds isolated from a tea concentrate). Tea, ready for drinking, was dispensed from the tea brewing machine and given to about 25 panelists. All of the panelists concluded that the tea dispensed from the machine of this invention had excellent flavor and aroma characteristics. Moreover, all of the panelists concluded that the dispensing machine of the present invention was quieter and easier to re-fill when asked to listen and refill the dispensing machine (comparing the same to conventional machines having a pump to pump beverage precursor and a pump to pump beverage enhancing component).

What is claimed is:

1. A dispensing machine comprising:
   (a) a conduit for transporting beverage enhancing component attached to a storage device comprising beverage enhancing component; and
   (b) a pre-pump conduit attached to a storage compartment comprising beverage precursor
   wherein the beverage enhancing component and beverage precursor are pumped within the dispensing machine with and through a single food grade pump to a post-pump conduit and the beverage precursor and beverage enhancing component mix prior to the food grade pump in the pre-pump conduit, the food grade pump creating negative pressure to draw beverage enhancing component out of the storage device.

2. The dispensing machine according to claim 1 wherein the post-pump conduit comprises a pre-beverage mixture having a beverage enhancing component and beverage precursor.

3. The dispensing machine according to claim 1 wherein the beverage enhancing component is a flavor-, aroma- or color-generating component, or a mixture thereof.

4. The dispensing machine according to claim 1 wherein the beverage enhancing component enhances the flavor and aroma of tea.

5. The dispensing machine according to claim 1 wherein the beverage precursor is a concentrate for making tea.

6. The dispensing machine according to claim 2 wherein the dispensing machine comprises a supply for diluent to be mixed with pre-beverage mixture.

7. The dispensing machine according to claim 5 wherein the dispensing machine dispenses ready-to-drink tea or coffee.

8. The dispensing machine according to claim 1 wherein the dispensing machine dispenses lemonade.

9. The dispensing pump according to claim 1 wherein the single food grade pump comprises a pre-beverage mixture of beverage enhancing component beverage enhancing component.

* * * * *